United States Patent
Degwekar et al.

(10) Patent No.: US 9,602,341 B1
(45) Date of Patent: Mar. 21, 2017

(54) SECURE MULTI-TENANT VIRTUAL CONTROL SERVER OPERATION IN A CLOUD ENVIRONMENT USING API PROVIDER

(71) Applicant: EMC Corporation, Hopkinton, MA (US)

(72) Inventors: Anil A. Degwekar, Karnataka (IN); Vasudevu Lakhinana, Karnataka (IN); Amit S. Herlekar, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 310 days.

(21) Appl. No.: 13/921,457

(22) Filed: Jun. 19, 2013

(51) Int. Cl.
*H04L 12/24* (2006.01)
*H04L 29/08* (2006.01)

(52) U.S. Cl.
CPC .... *H04L 41/0806* (2013.01); *H04L 29/08144* (2013.01); *H04L 29/08171* (2013.01)

(58) Field of Classification Search
CPC ........... H04L 41/0806; H04L 29/08144; H04L 29/06; H04L 29/08072; H04L 29/08171; H04L 12/5695
USPC .................................................. 709/225, 226
See application file for complete search history.

(56) References Cited

U.S. PATENT DOCUMENTS

| | | | |
|---|---|---|---|
| 7,054,883 B2 | 5/2006 | Meiri et al. | |
| 7,266,706 B2 | 9/2007 | Brown et al. | |
| 7,475,207 B2 | 1/2009 | Bromling et al. | |
| 7,577,722 B1 | 8/2009 | Khandekar et al. | |
| 7,613,890 B1 | 11/2009 | Meiri | |
| 7,885,276 B1 | 2/2011 | Lin | |
| 7,949,637 B1 | 5/2011 | Burke | |
| 7,975,018 B2 | 7/2011 | Unrau et al. | |
| 8,335,899 B1 | 12/2012 | Meiri et al. | |
| 8,819,230 B2 * | 8/2014 | Nahum | G06F 3/0607 709/225 |
| 2005/0120160 A1* | 6/2005 | Plouffe | G06F 9/45537 711/1 |
| 2007/0115818 A1* | 5/2007 | Bose | H04L 41/0806 370/230 |
| 2010/0042720 A1* | 2/2010 | Stienhans | G06F 9/5072 709/226 |
| 2010/0050173 A1* | 2/2010 | Hensbergen | G06F 9/5072 718/1 |
| 2011/0184993 A1* | 7/2011 | Chawla | G06F 9/45533 707/802 |

(Continued)

OTHER PUBLICATIONS

U.S. Appl. No. 12/930,249, filed Dec. 31, 2010, Monden et al.

(Continued)

*Primary Examiner* — Patrice Winder
*Assistant Examiner* — Aye M Aung
(74) *Attorney, Agent, or Firm* — Muirhead and Saturnelli, LLC

(57) ABSTRACT

In a system that separates the control (management) layer from the data layer of a distributed storage system, an application programming interface (API) provider is presented that manages storage awareness of the virtual control servers with at least one virtual array and underlying physical arrays. The system described herein advantageously enables multi-tenant support to provide individual and/or isolated access to shared storage resources among multiple tenants and offers improved scalability and operations in a cloud deployment.

20 Claims, 14 Drawing Sheets

(56) References Cited

U.S. PATENT DOCUMENTS

| | | | |
|---|---|---|---|
| 2012/0102572 A1* | 4/2012 | Murakami et al. ............ 726/28 |
| 2012/0179820 A1* | 7/2012 | Ringdahl .................. G06F 8/63 |
| | | | 709/225 |
| 2013/0007265 A1* | 1/2013 | Benedetti ............ H04L 67/1097 |
| | | | 709/224 |
| 2014/0259190 A1* | 9/2014 | Kiang ................ G06F 21/6218 |
| | | | 726/30 |

OTHER PUBLICATIONS

U.S. Appl. No. 12/932,080, filed Deb. 17, 2011, Meiri et al.
U.S. Appl. No. 13/136,359, filed Jul. 29, 2011, Van der Goot.
U.S. Appl. No. 13/537,839, filed Jun. 29, 2012, Palekar et al.
U.S. Appl. No. 13/561,340, filed Jul. 30, 2012, Jain et al.
U.S. Appl. No. 13/721,502, filed Dec. 20, 2012, Palekar et al.
EMC Corporation, "Integrating Cloud Orchestration with EMC Symmetrix VMAX Cloud Edition Rest APIs," White paper H11468, Feb. 2013, 34 pp.
EMC Corporation, "Implementing VMware VSphere Storage API for Storage Awareness with Symmetrix Storage Arrays," White paper H10630, Apr. 2012, 30 pp.
EMC Corporation, "Using VMware VSphere with EMC VPLEX," White paper H7118.2, Jul. 2011, 80 pp.

* cited by examiner

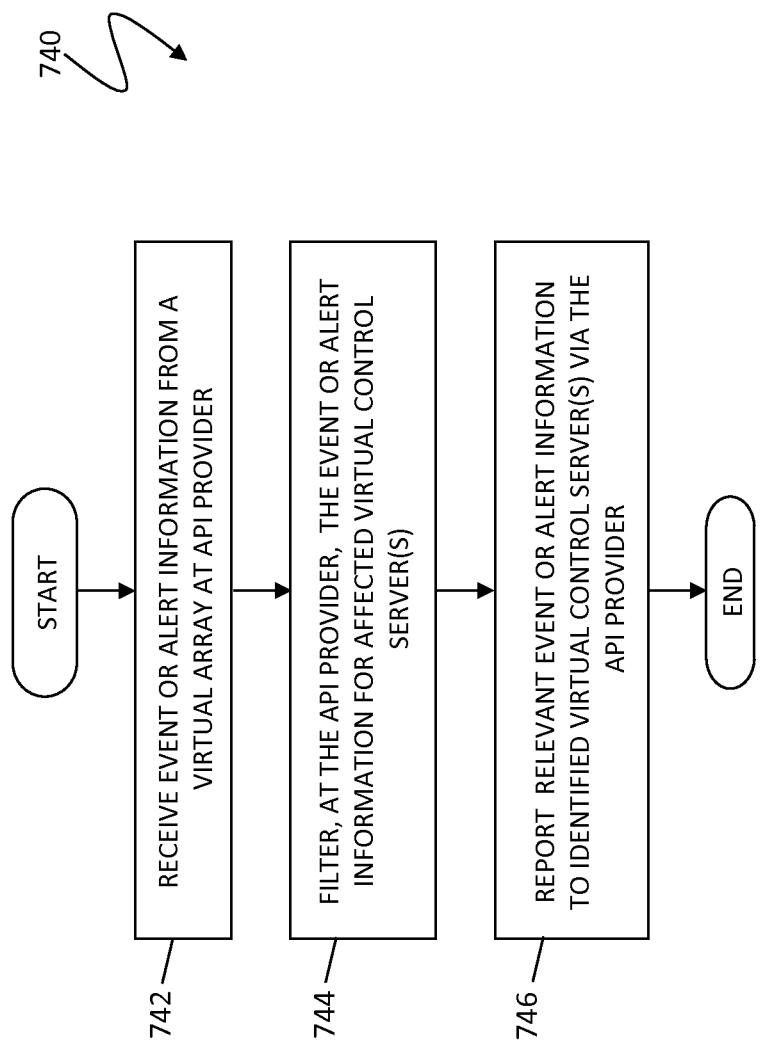

SECURE MULTI-TENANT VIRTUAL CONTROL SERVER OPERATION IN A CLOUD ENVIRONMENT USING API PROVIDER

TECHNICAL FIELD

This application is related to the field of data storage and, more particularly, to systems for managing data and resources in a virtualized environment.

BACKGROUND OF THE INVENTION

In current storage networks, and particularly storage networks including geographically distributed directors (or nodes) and storage resources, preserving or reducing bandwidth between resources and directors while providing optimized data availability and access is highly desirable. Data access may be localized, in part, to improve access speed to pages requested by host devices. Caching pages at directors provides localization, however, it is desirable that the cached data be kept coherent with respect to modifications at other directors that may be caching the same data. An example of a system for providing distributed cache coherence is described in U.S. Pat. No. 7,975,018 to Unrau et al., entitled "Systems and Methods for Providing Distributed Cache Coherence," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Particularly for asynchronous transfers, it is desirable to maintain a proper ordering of writes such that any errors or failures that occur during data transfer may be properly identified and addressed such that, for example, incomplete data writes be reversed or rolled back to a consistent data state as necessary.

Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system. Discussions of data ordering techniques for synchronous and asynchronous data replication processing for other types of systems, including types of remote data facility (RDF) systems produced by EMC Corporation of Hopkinton, Mass., may be found, for example, in U.S. Pat. No. 7,613,890 to Meiri, entitled "Consistent Replication Across Multiple Storage Devices," U.S. Pat. No. 7,054,883 to Meiri et al., entitled "Virtual Ordered Writes for Multiple Storage Devices," and U.S. Pat. No. 8,335,899 to Meiri et al., entitled "Active/Active Remote Synchronous Mirroring," which are all incorporated herein by reference.

In a virtualized environment, a centralized management infrastructure, henceforth referred to as a virtual control server, may provide a central point of control for managing, monitoring, provisioning and migrating virtual machines. A virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The virtual control server may operate to control virtual machines in data centers and, for example, in connection with cloud computing. The virtual control server may further include a virtual data center that provides logical control and management of data storage in a data center, and provides for sub-dividing contents of virtual components into compute resources, network resources and storage resources. Under various circumstances, it may be advantageous to control access to resources among the virtual components, including sharing of distributed resources among the virtual components.

A distributed storage system of a virtualized environment may include a grid, and/or other configuration, of different storage nodes connected to each other over synchronous and/or asynchronous latencies. Coordinating and controlling the sharing of resources distributed among these different storage nodes may, in many cases, be difficult or problematic using known technologies. In some cases, known distributed storage systems of virtualized environments may not provide suitable multi-tenancy support. Such systems may filter resources only based on physical attributes (ports, initiators, etc.) and thereby expose physical array details to the virtual control servers of the virtualized storage environment. In a large cloud deployment, this may result in unnecessary details and information being reported to one or more virtual control servers. Such an approach is not efficient and may undesirably reduce or prevent multi-tenant isolation of the underlying storage platform.

Accordingly, it is desirable to provide an effective and efficient system to address issues like that noted above for a distributed system in a virtualized environment.

SUMMARY OF THE INVENTION

According to the system described herein, a method of sharing resources in a virtualized environment includes managing distributed resources of the virtualized environment using at least one virtual array. A plurality of virtual control servers may access the at least one virtual array. An application programming interface (API) provider is provided that manages interfacing between the plurality of virtual control servers and the at least one virtual array. The API provider receives requests from the plurality of virtual control servers. The API provider identifies resources of the at least one virtual array that are responsive to the requests. The API provider reports relevant resources independently to each of the plurality of virtual control servers, the relevant resources being separately responsive to each of the requests from the plurality of virtual control servers. The distributed resources may be provided using a plurality of storage devices that are remotely located from each other. An administrator of each of the plurality of virtual control servers may use corresponding credentials to access the at least one virtual array via the API provider. The at least one virtual array may include a plurality of virtual arrays, each of the virtual arrays having distinct characteristics. The API provider may be used to maintain isolation between the plurality of virtual control servers while enabling shared access of the resources of the at least one virtual array.

According further to the system described herein, a non-transitory computer-readable medium stores software for sharing resources in a virtualized environment. The software includes executable code that manages distributed resources of the virtualized environment using at least one virtual array. Executable code is provided that provides an application programming interface (API) provider that manages interfacing between a plurality of virtual control servers and the at least one virtual array. Executable code is provided that receives, at the API provider, requests from the plurality of virtual control servers. Executable code is provided that identifies, at the API provider, resources of the at least one virtual array that are responsive to the requests. Executable code is provided that reports relevant resources independently to each of the plurality of virtual control servers from the API provider, the relevant resources being separately responsive to each of the requests from the plurality of virtual control servers. The distributed resources may be provided using a plurality of storage devices that are remotely located from each other. Executable code may be provided that receives credentials of an administrator of each of the plurality of virtual control servers that are used to access the at least one virtual array via the API provider. The at least one virtual array may include a plurality of virtual arrays, each of the virtual arrays having distinct characteristics. Executable code may be provided that enables the API provider to be used to maintain isolation between the plurality of virtual control servers while enabling shared access of the resources of the at least one virtual array.

According to the system described herein, a method of filtering information in a virtualized environment includes managing distributed resources of the virtualized environment using at least one virtual array. A plurality of virtual control servers may access the at least one virtual array. An application programming interface (API) provider is provided that manages interfacing between the plurality of virtual control servers and the at least one virtual array. Event or alert information concerning the distributed resources of the virtual array is received at the API provider. The event or alert information is filtered at the API to identify individual ones of the plurality of virtual control servers affected by the event or alert information. Relevant event or alert information is reported independently to each of the plurality of virtual control servers from the API provider, the relevant event or alert information corresponding to affected ones of the virtual control servers separately affected by the relevant event or alert information. The distributed resources may be provided using a plurality of storage devices that are remotely located from each other. An administrator of each of the plurality of virtual control servers may use corresponding credentials to access the at least one virtual array via the API provider. The at least one virtual array may include a plurality of virtual arrays, each of the virtual arrays having distinct characteristics. The API provider may be used to maintain isolation between the plurality of virtual control servers while enabling shared access of the resources of the at least one virtual array.

According further to the system described herein, a non-transitory computer-readable medium stores software for filtering information in a virtualized environment. The software includes executable code that manages distributed resources of the virtualized environment using at least one virtual array. Executable code is provided that provides an application programming interface (API) provider that manages interfacing between the plurality of virtual control servers and the at least one virtual array. Executable code is provided that receives, at the API provider, event or alert information concerning the distributed resources of the virtual array. Executable code is provided that filters, at the API provider, the event or alert information to identify individual ones of the plurality of virtual control servers affected by the event or alert information. Executable code is provided that reports relevant event or alert information independently to each of the plurality of virtual control servers from the API provider, the relevant event or alert information corresponding to affected ones of the virtual control servers separately affected by the relevant event or alert information. The distributed resources may be provided using a plurality of storage devices that are remotely located from each other. Executable code may be provided that receives credentials of an administrator of each of the plurality of virtual control servers that are used to access the at least one virtual array via the API provider. The at least one virtual array may include a plurality of virtual arrays, each of the virtual arrays having distinct characteristics. Executable code may be provided that enables the API provider to be used to maintain isolation between the plurality of virtual control servers while enabling shared access of the resources of the at least one virtual array.

BRIEF DESCRIPTION OF THE DRAWINGS

Embodiments of the system described herein are explained with reference to the several figures of the drawings, which are briefly described as follows.

FIG. 14 is a flow diagram showing processing for multi-tenant virtual control server operation for processing received events or alerts of a virtual array in a cloud environment according to an embodiment of the system described herein.

DETAILED DESCRIPTION OF VARIOUS EMBODIMENTS

Figure 1:
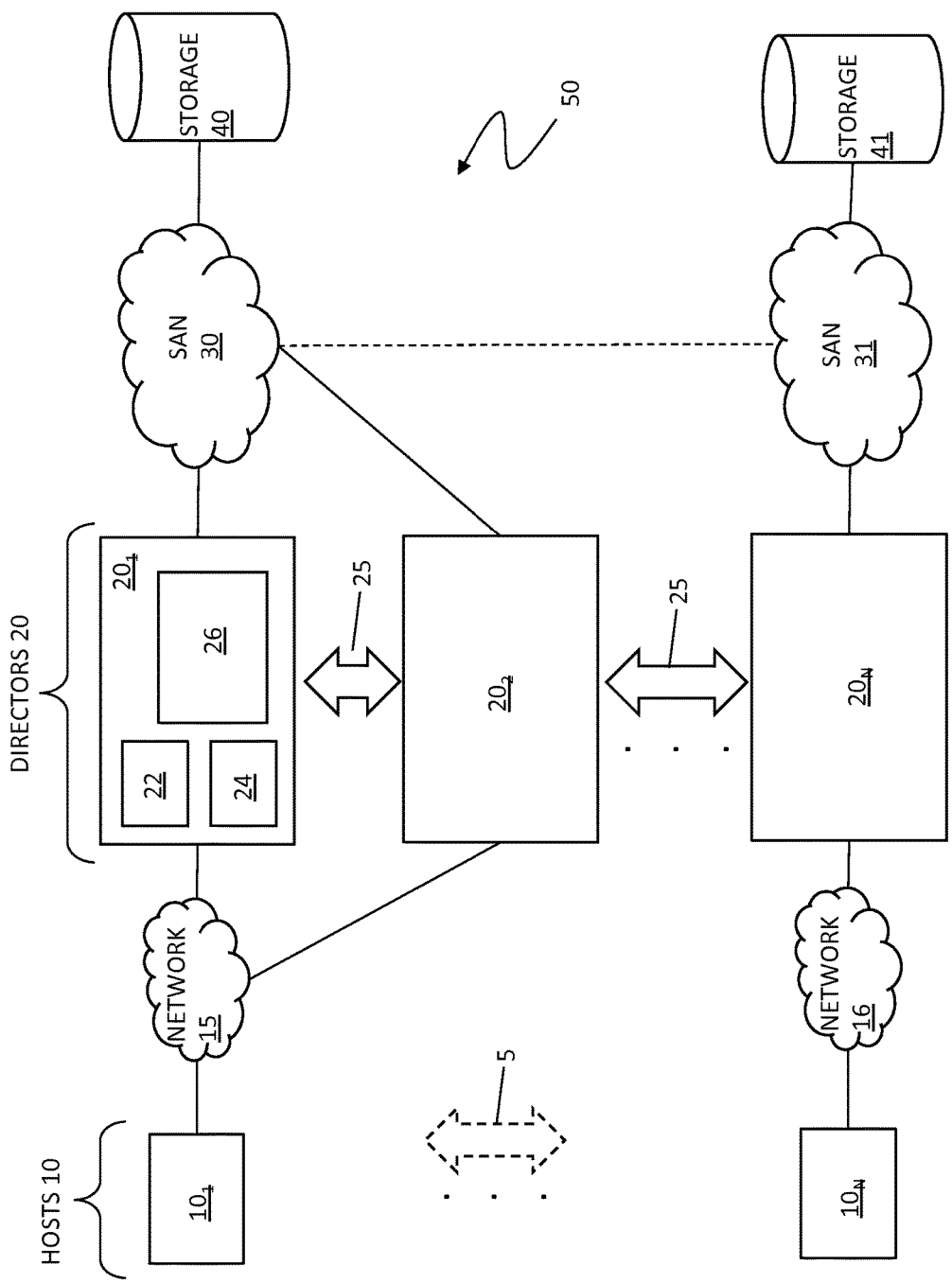
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "N" is used herein to indicate an indefinite plurality, so that the number "N" when referred to one component does not necessarily equal the number "N" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another. It is also noted that in various embodiments the networks 15, 16 may be combined with the SAN networks 30, 31.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a vSphere product produced by VMware Inc. of Palo Alto, Calif. and/or VPLEX product produced by EMC Corporation of Hopkinton, Mass. The system described herein may also be used in connection with storage products produced by EMC Corporation, such as a Symmetrix, VMAX, VNX and/or Isilon product. Although discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image is the state of the virtual machine as it resides in the host's memory. The VM image may be obtained for an operating VM and transferred to another location where the VM continues execution from the state defined by the virtual machine image. In this way, the VM image may be a snapshot of an execution state of a program by a VM that may be moved between different locations and processing thereafter continued without interruption.

As discussed in detail elsewhere herein, in a virtualized environment, a virtual center or virtual control server, an example of which may be a vCenter product produced by VMware, may provide a central point of control for managing, monitoring, provisioning and migrating virtual machines. A virtual control server may operate to control virtual machines in data centers and, for example, in connection with cloud computing. A virtual control server may further include a virtual data center that provides logical control and management of data storage in a data center. A virtual control sever may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Ionix Unified Infrastructure Manager (UIM) may be integrated with Vblock and provide a management console for management of the Vblock package.

It is also noted that the system described herein may be used in connection with thin provisioning processes and techniques. Thin provisioning (also known as virtual provisioning) allows for the creation of logical volumes of storage space where allocation of physical storage space occurs only when space is actually needed (e.g., when data is actually written to the storage space). Logical storage space may be identified to a user as being available even though no physical storage space has been committed, at least initially. When data is written to the logical storage space, physical storage space is drawn for use from a pool of physical storage space, as further described elsewhere herein. For a more detailed discussion of thin provisioning and uses thereof in connection with tiered storage systems and techniques, reference is made, for example, to U.S. Pat. No. 7,949,637 to Burke, entitled "Storage Management for Fine Grained Tiered Storage with Thin Provisioning," which is incorporated herein by reference.

Figure 2:
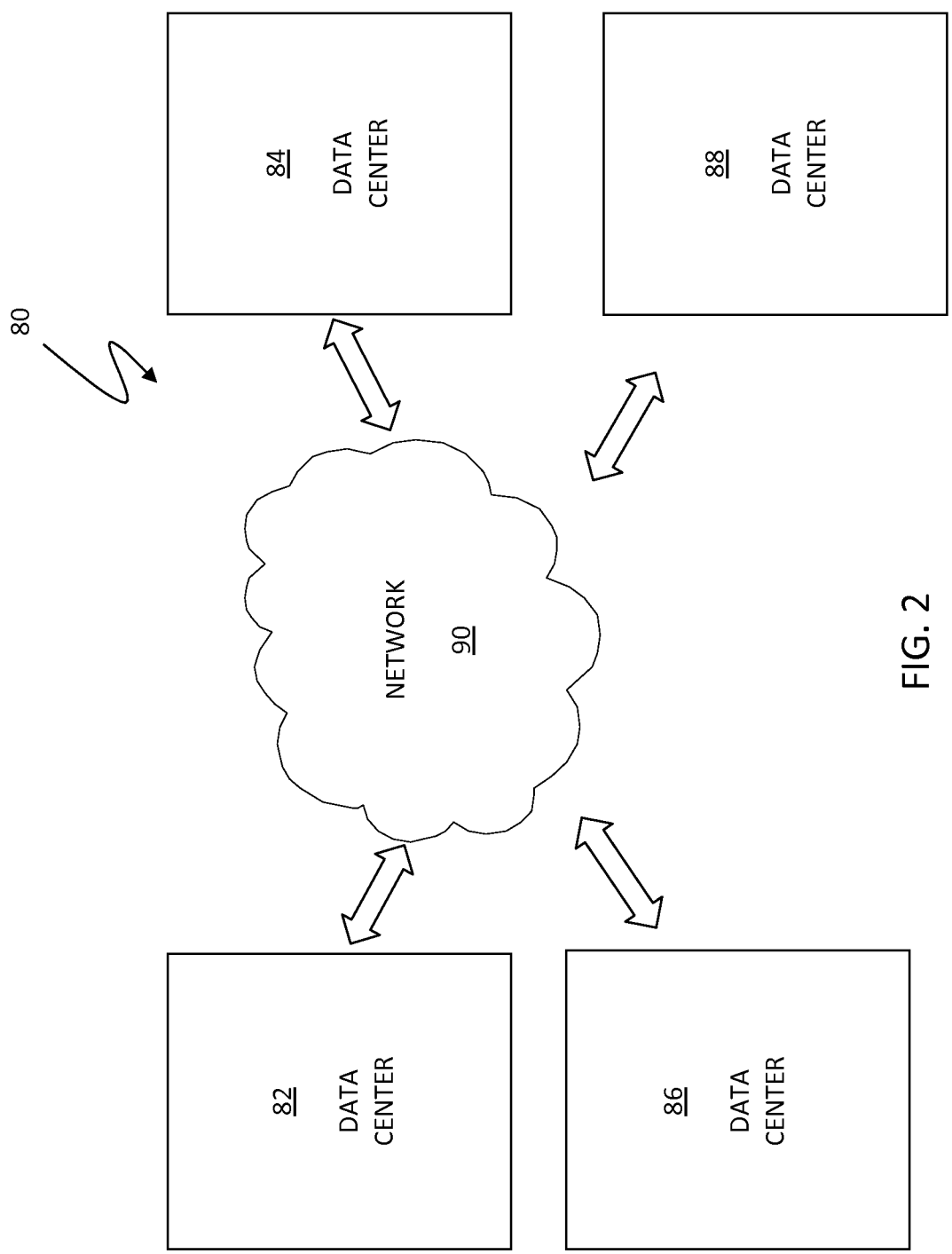
FIG. 2 is a schematic illustration showing a system that includes a plurality of data centers in communication via a network that may be used in accordance with an embodiment of the system described herein.

FIG. 2 is a schematic illustration showing a system 80 that includes a first data center 82 in communication with a second data center 84 via a network 90. Although the following embodiments are discussed principally in connection with data centers 82, 84 any number of additional data centers, represented as data centers 86', 88, may also be used in connection with the system described herein. Each of the data centers 82, 84 may include a plurality of storage devices and processors (not shown in FIG. 2) for executing applications using a plurality of VMs and which may be controlled and/or managed in connection with one or more virtual control servers and virtual data centers. The VMs may be configured using any appropriate server virtualization technology, such as vSphere. VSphere is a suite of tools/applications offering the ability to perform cloud computing utilizing enterprise-level virtualization products such as VMware's ESX and/or ESXi hosts. VSphere allows multiple VMs to run on any ESX host. Other VM technology may be used including any appropriate VM technology provided by other vendors.

The data centers 82, 84 may contain any number of processors and storage devices that are configured to provide the functionality described herein. In an embodiment herein, the storage devices may be storage arrays provided by EMC Corporation of Hopkinton, Mass. Other appropriate types of storage devices and different types of processing devices may also be used in connection with the system described herein. The data centers 82, 84 may be configured similarly to each other or may be configured differently. The network 90 may be any network or similar mechanism allowing data communication between the data centers 82, 84. In an embodiment herein, the network 90 may be the Internet and/or any other appropriate network and each of the data centers 82, 84 may be coupled thereto using any appropriate mechanism. In other embodiments, the network 90 may represent a direct connection (e.g., a physical connection) between the data centers 82, 84.

In various embodiments, VMs may be migrated from a source one of the data centers 82, 84 to a destination one of the data centers 82, 84. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van der Goot, filed Jul. 29, 2011, entitled "Active/Active Storage and Virtual Machine Mobility Over Asynchronous Distances," which are incorporated herein by reference. A product, such as EMC's VPLEX Metro and/or VPLEX Geo, may be used to enable the resources of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that the term "VPLEX" used herein may also generally be understood to refer to and include any appropriate software and/or component packages that provide for coordinating and/or federating resources of disparate systems as a single pool of virtual resources, in particular, for example, a single pool of virtual storage.

Figure 3:
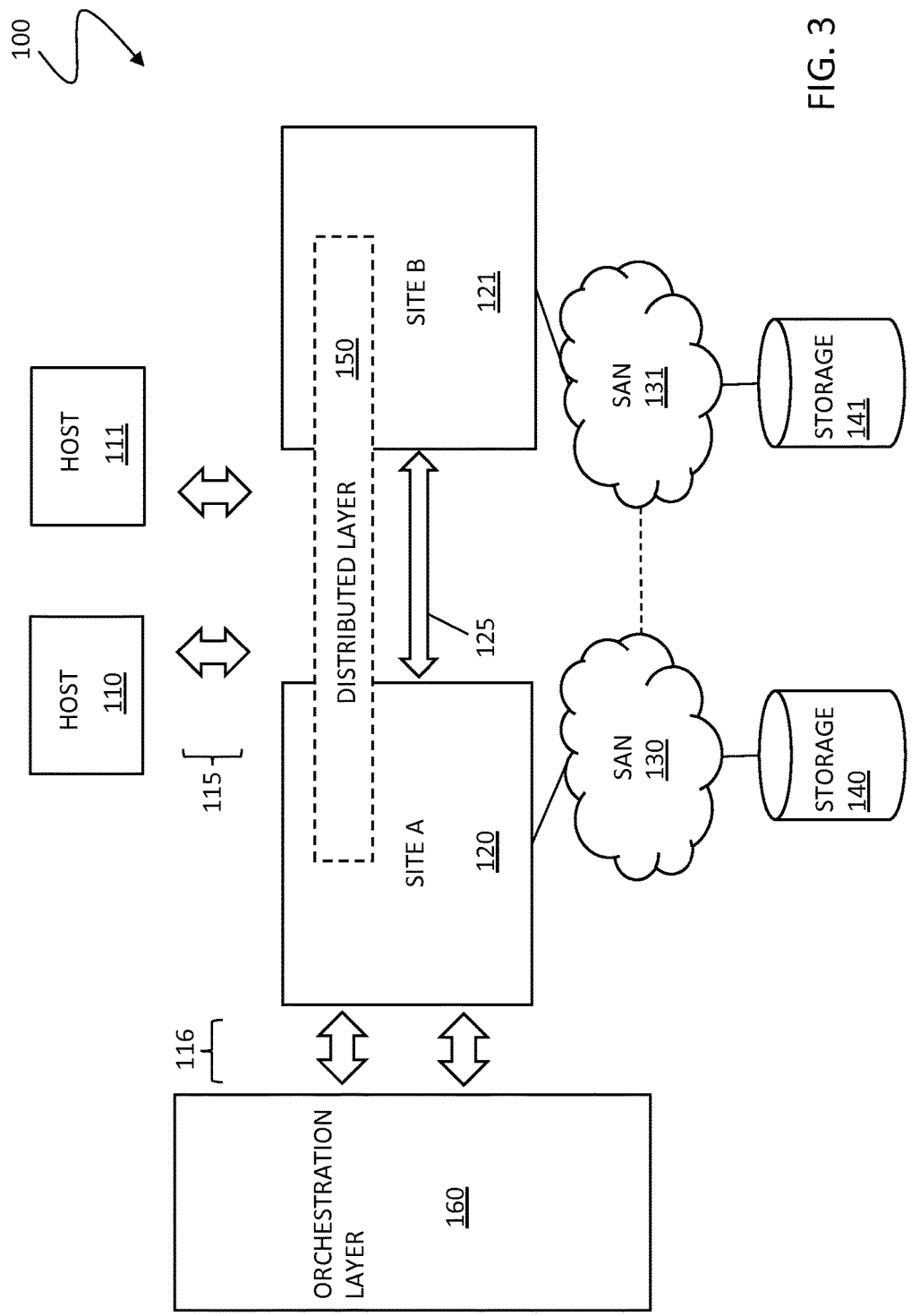
FIG. 3 is a schematic illustration showing a distributed storage system according to an embodiment of the system described herein.

FIG. 3 is a schematic illustration showing a distributed storage system 100 according to an embodiment of the system described herein. The system may include a collection of multiple sites, such as site A 120 and site B 121, that may each include one or more directors like the directors 20 discussed elsewhere herein. Although two sites are shown, more than two sites may be used and operated in connection with the system described herein. As further discussed elsewhere herein, the sites 120, 121 may be located geographically distant from each other. In an embodiment, the distributed storage system 100 may operate in an active/active mode in which multiple sites may provide mirroring for at least some of the data and may handle processing of host read/write I/O requests. The sites 120, 121 may be connected via an interconnection 125, such as an IP network, PCI bus, FC network and/or any other type of network. Hosts 110, 111 are shown that may communicate with the sites 120, 121, as further discussed elsewhere herein. The hosts 110, 111 may be representative of any number of hosts that may perform I/O access operations in the distributed storage system 100.

The sites 120, 121 may be coupled via SANs 130, 131 to storage resources 140, 141. The storage resources 140, 141 may be located in proximity to the sites 120, 121 and/or may be remotely located and accessed. In an embodiment, the SANs 130, 131 may be separate networks. Alternatively, in another embodiment, the SANs 130, 131 may be part of the same network, an embodiment shown represented by a dashed line connecting the SANs 130, 131. In various embodiments, joint operations performed by the sites 120, 121 may include multiple, independent sub-computations and may include operations of a clustered small computer system interface (SCSI) device corresponding to use of external storage nodes that may be accessed by one or more of the sites 120, 121.

A distributed layer 150 is shown schematically as a system of the sites 120, 121 that may be distributed across the sites 120, 121 in connection with processing of one or more access nodes. In a virtualization environment, the distributed layer 150 may function like a virtual control server that provides for control of managing, monitoring, provisioning and migrating virtual machines. The virtual control server may provide for managing deployment of virtual machines at one or more data centers, like the sites 120, 121, and may operate to control virtual machines at the sites 120, 121 in connection with cloud computing including both internal and external cloud infrastructures and hybrids thereof.

An orchestration layer 160 may be provided that provides policy driven orchestration for controlling access and/or load balancing in connection with servicing I/O requests among the sites 120, 121 in a cloud computing environment. I/O requests from the hosts 110, 111 may be received by one or more of the sites 120, 121 over a communication link 115 that may be a network, such as the Internet and/or other suitable communication link. The orchestration layer 160 may be coupled to the sites 120, 121, including the distributed layer 150, via a communication link 116 that may be the same as or a different network than the communication link 115. The orchestration layer 160 may control and implement policies and/or other information for the servicing I/O requests at one or more of the sites 120, 121, as further discussed elsewhere herein. In various embodiments, the orchestration layer 160 may be a software layer that is distributed across the sites 120, 121 like the distributed layer 150 and/or may be integrated in connection with an independent compute entity coupled to the sites 120, 121. The orchestration layer 160 orchestrates, based, for example, on policies and/or other information fed from manual and dynamic inputs, where compute and storage processes may reside and provides non-disruptive control for the servicing of I/O requests that is fully enabled by a dynamic active/active storage platform. For further discussion of operations and features of orchestration layers in a cloud environment, reference is made to U.S. patent application Ser. No. 12/930, 249 to Monden et al., filed Dec. 31, 2010, entitled "Fully Automated Cloud Tiering," which is incorporated herein by reference.

Figure 4:
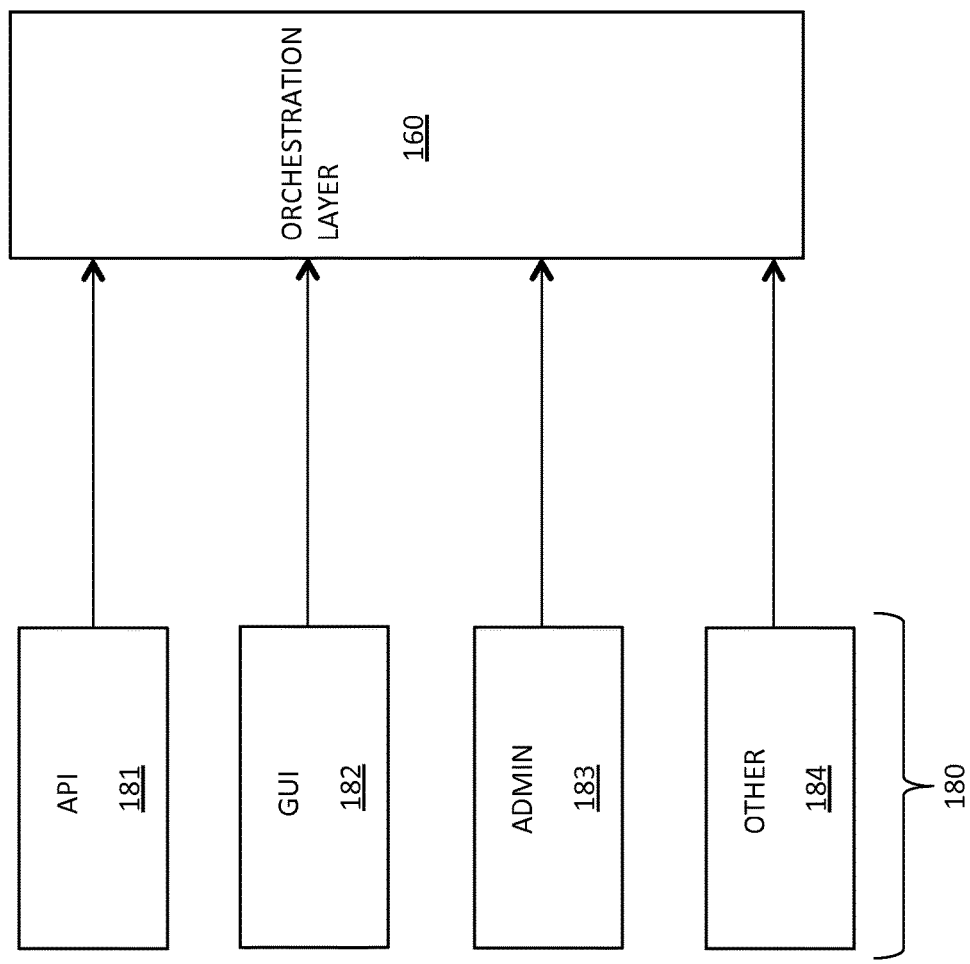
FIG. 4 is a schematic illustration showing inputs to the orchestration layer in connection with controlling the servicing of I/O requests at one or more sites and based on one or more policies implemented by the orchestration layer according to an embodiment of the system described herein.

FIG. 4 is a schematic illustration showing inputs to the orchestration layer 160 in connection with controlling the servicing of I/O requests at one or more sites and based on one or more policies implemented by the orchestration layer 160 according to an embodiment of the system described herein. In various embodiments, inputs to the orchestration layer 160 may include inputs 180 from one or more application programming interfaces (APIs) 181, graphical user interfaces (GUI) 182, administrator inputs 183 directly to the orchestration layer and/or other input mechanisms 184.

In another embodiment, one or more of the inputs 180 may provide information obtained from one or more of the sites 120, 121 and/or from one or more of the hosts 110, 111 with input information obtained from one or more users. The inputs 180 may reflect specific information corresponding to service level agreements (SLAs) with respect to service agreements for one or more customers and service providers. The orchestration layer 160 may maintain and update various types of policies for controlling and/or otherwise governing processing requirements, such as requirements of a particular SLA, load balancing requirements, requirements of minimizing processing costs and/or maximizing processing speed for one or more I/O requests and/or other processing considerations. In various embodiments, the orchestration layer 160 may include a policy engine that makes determinations driven by business policies, SLAs, performance requirements, utility or other rate schedules and/or other appropriate type of dynamic service input or dynamic triggers to execute various orchestration events.

The orchestration layer 160 may be used to control selection of sites for the servicing of I/O requests according to the one or more policies and based on the inputs 180 to the orchestration layer 160. In an embodiment, the distributed layer 150 of one or more of the sites 120, 121 may determine an appropriate one of the sites 120, 121 to handle any particular I/O request based on the policy and/or other information maintained by the orchestration layer 160 and route the I/O request to the appropriately determined site. The system described herein provides a system that may respond to a particular level of activity at one or more of the sites 120, 121. For example, a burst of data processing requests may occur for a particularly high usage period in the middle of the day for one or more of the sites (e.g., site 120). Accordingly, routing of I/O requests to another site (e.g., site 121) may be controlled using the orchestration layer 160 in response to a burst period.

Figure 5:
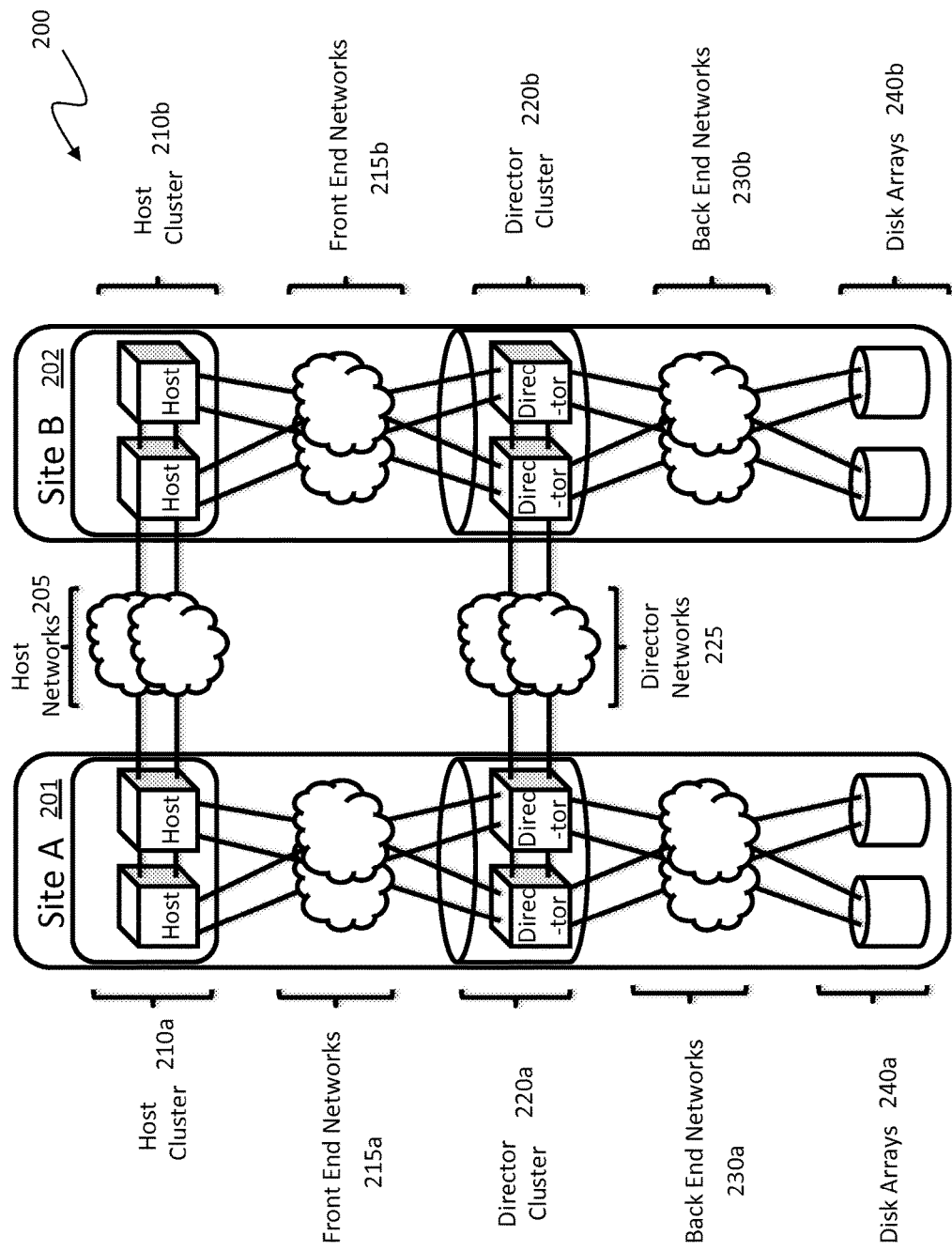
FIG. 5 is a schematic illustration showing a distributed storage system with multiple sites according to an embodiment of the system described herein.

FIG. 5 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors.

In an embodiment, each host cluster 210a,b may include hosts, such as ESX hosts, in a vSphere cluster and each director cluster 220a,b may include directors in a VPLEX cluster. It is noted that although ESX hosts and illustrated and discussed herein as examples, any appropriate host may be used in connection with the system described herein. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) of the host clusters 210a,b, to perform I/O operations with the director clusters 220a,b, while the back end networks 230a,b allow the directors of the director clusters 220a,b to perform I/O on the disk arrays 240a,b. One or more host networks 205, such as vSphere Ethernet networks, connect the ESX hosts in host clusters 210a,b. One or more director networks 225 connect the directors of the director clusters 220a,b. It is noted that in other embodiments, the host cluster 210 may be implemented as a distributed processing layer operating across the multiple sites 201, 202, and/or the front end networks may be external networks accessed by each of the sites 201, 202.

Various types of failures, including network failures within a cluster, may result in behaviors that are further discussed elsewhere herein. It should be noted that the host cluster 210a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired. For further detailed discussion of specific system behaviors in connection with different types of failure scenarios, reference is made, for example, to U.S. patent application Ser. No. 13/136,359 to Van Der Goot.

Figure 6:
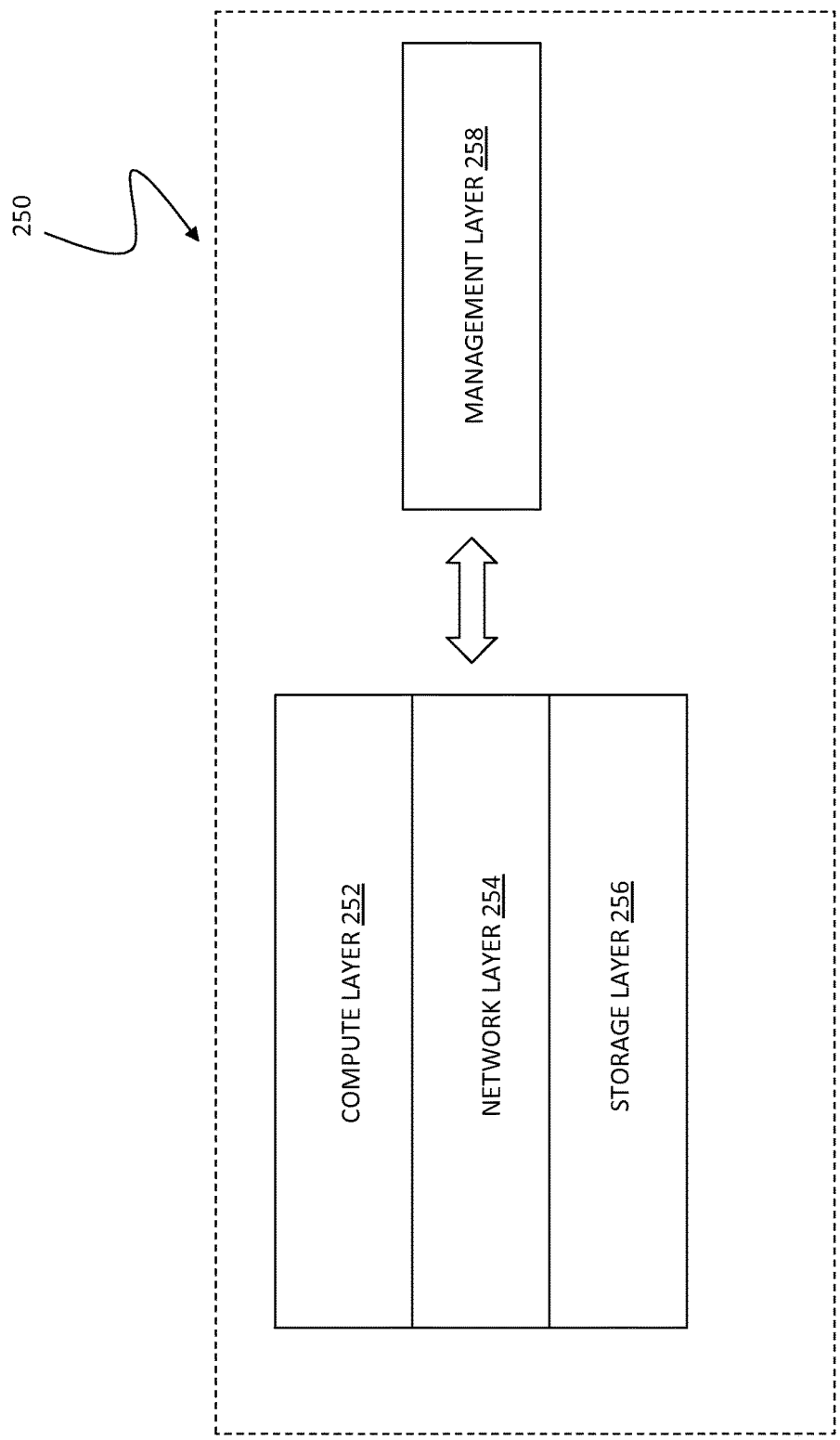
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. In various embodiments, the system described herein may provide for dynamic federation of distributed resources that may include storage, compute and/or network resources. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute and storage layers 252, 256 within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM) product.

The system described herein may provide for advantageous sharing of resources using a virtual platform product that federates and/or coordinates virtual storage. In various embodiments, the resources may be resources supported by virtual data centers, and including virtualized storage products, such as EMC's VMAX and/or VNX products, and/or converged infrastructure products, such as VCE's Vblock products. The system described herein may enable migration of resources dynamically and non-disruptively, thereby allowing a user to move storage data and/or compute processing. For example, the system described herein may enable migration of the contents of one VMAX to another VMAX and/or may enable migration of contents of a virtual data center to another virtual data center that may be contained in the same or different VMAX's and may provide for seamless migration within a data center and/or among multiple data centers. By enabling use of dynamic policies, the system described herein allows for dynamically load balanced among virtual platforms and infrastructure products.

According to an embodiment of the system described herein, distributed resources may be shared between multi-connected virtual platforms, such as VPLEX clusters, in a dynamic sharing arrangement. A virtual platform may include one or more pairs of directors that enables failover from one director of the pair(s) to the other director of the pair(s) in a cluster in the case of hardware or path failure. In an exclusive sharing arrangement between two virtual platforms (e.g., between two VPLEX clusters), the distributed resources are shared in an all-or-nothing arrangement in which either all or none of the distributed resources are shared between the two VPLEX clusters. In an embodiment, the system described herein advantageously enables a dynamic sharing relationship between multiple virtual platforms that may be tied to specific resources.

Figure 7:
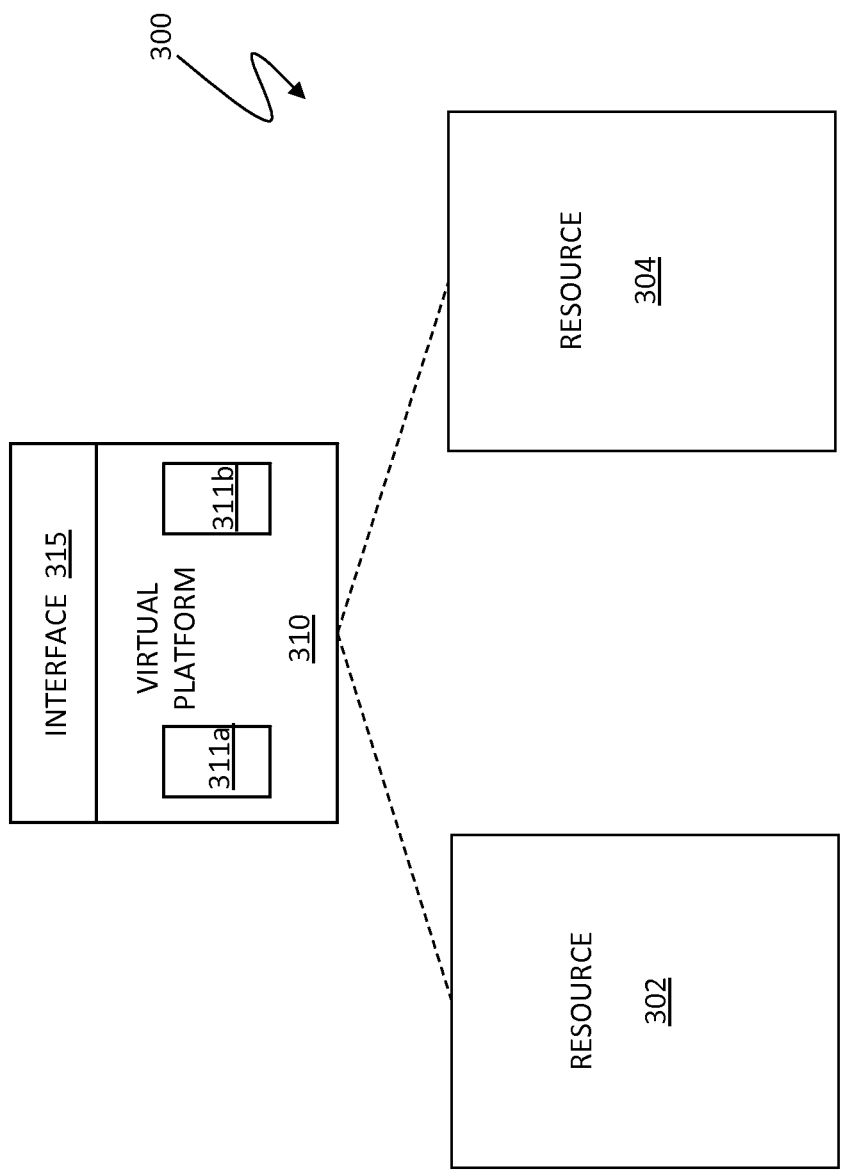
FIG. 7 is a schematic illustration showing a distributed processing system with a virtual platform controlling access to separate resources according to an embodiment of the system described herein.

FIG. 7 is a schematic illustration showing a distributed processing system 300 with a virtual platform 310 controlling access to separate resources 302, 304 that may be, for example, distributed storage devices, such as provided by an EMC storage product, including, for example, an EMC Symmetrix or VMAX product and/or a converged infrastructure product, such as a VCE's Vblock, for example. Although two resources 302, 304 are shown, the system described herein may be used in connection with any number of resources to satisfy desired configuration requirements. In various embodiments, the resources 302, 304 may be separated by a latency that allows for synchronous or asynchronous transference of data therebetween. In various embodiments, the resources 302, 304 may also include separate storage devices in the same or different data centers and/or may include different virtual data centers within the same storage device. For further discussions of systems and techniques for managing distributed resources in virtualized environments with one or more virtual platforms, reference is made to U.S. patent application Ser. No. 13/721,502 to Palekar et al., filed Dec. 20, 2012, entitled "Distributed Dynamic Federation between Multi-Connected Virtual Platform Clusters," U.S. patent application Ser. No. 13/537,839 to Palekar et al., filed Jun. 29, 2012, entitled "Relocating a Virtual Data Center," which are incorporated herein by reference.

The virtual platform 310 may include one or more pairs of directors 311a, 311b that enables failover from one director of the pair(s) to the other director of the pair(s) in a cluster in the case of hardware or path failure, as further discussed elsewhere herein. In an embodiment, the virtual platform 310 may include a VPLEX cluster component (e.g., VPLEX Metro for synchronous latencies and/or VPLEX Geo for asynchronous latencies) that may be used to provide high availability support for host clusters, including ESX host cluster support and vSphere operations, for the pairing of the resources 302, 304 for operations, for active/active storage operations and/or site failure handling for disaster recovery operations. The illustrated embodiment may be used to advantageously reduce durations for a recovery point objective (RPO) and a recovery time objectives (RTO) in connection with recovery operations using multiple storage devices. It is further noted that although the virtual platform 310 is shown as a separate component, the virtual platform component 310 may be implemented as a software layer distributed across one or more storage devices providing the resources 302, 304. In the virtualization environment of the system 300, the virtual platform 310 may function to provide for control of managing, monitoring, provisioning and migrating virtual machines among storage devices of one or more data centers.

An interface 315 may be provided to enable orchestration of the resource access and/or other control functions among the resources 302, 304, including migration of virtual data centers (VDCs). In an embodiment, the interface 315 may be provided by a common management layer, such as a management layer 258 (see FIG. 6), used to manage the storage device(s). The interface 315 may provide policy driven orchestration for controlling access and/or operations in connection with VDC migration. The interface 315 may be used in connection with controlling and implement policies and/or other information for migration operations and/or servicing of I/O requests. The interface 315 may be used to orchestrate the resource sharing based on policies and/or other information fed from manual and dynamic inputs, where compute and storage processes may reside, and provides non-disruptive control and/or dynamic load balancing among the resources 302, 304.

In various embodiments, migration and/or access of objects among the resources 302, 304 may be performed in connection with storage tiering between storage devices. For example, resource 302 may include storage arrays of a first type and resource 304 may include storage arrays of a second type, in which the first and second types of storage arrays having different characteristics. For example, the first type may be of a type that has fast accessibility (or more expensive) whereas the second type of storage may be of a slower (or less expensive) accessibility type.

Figure 8:
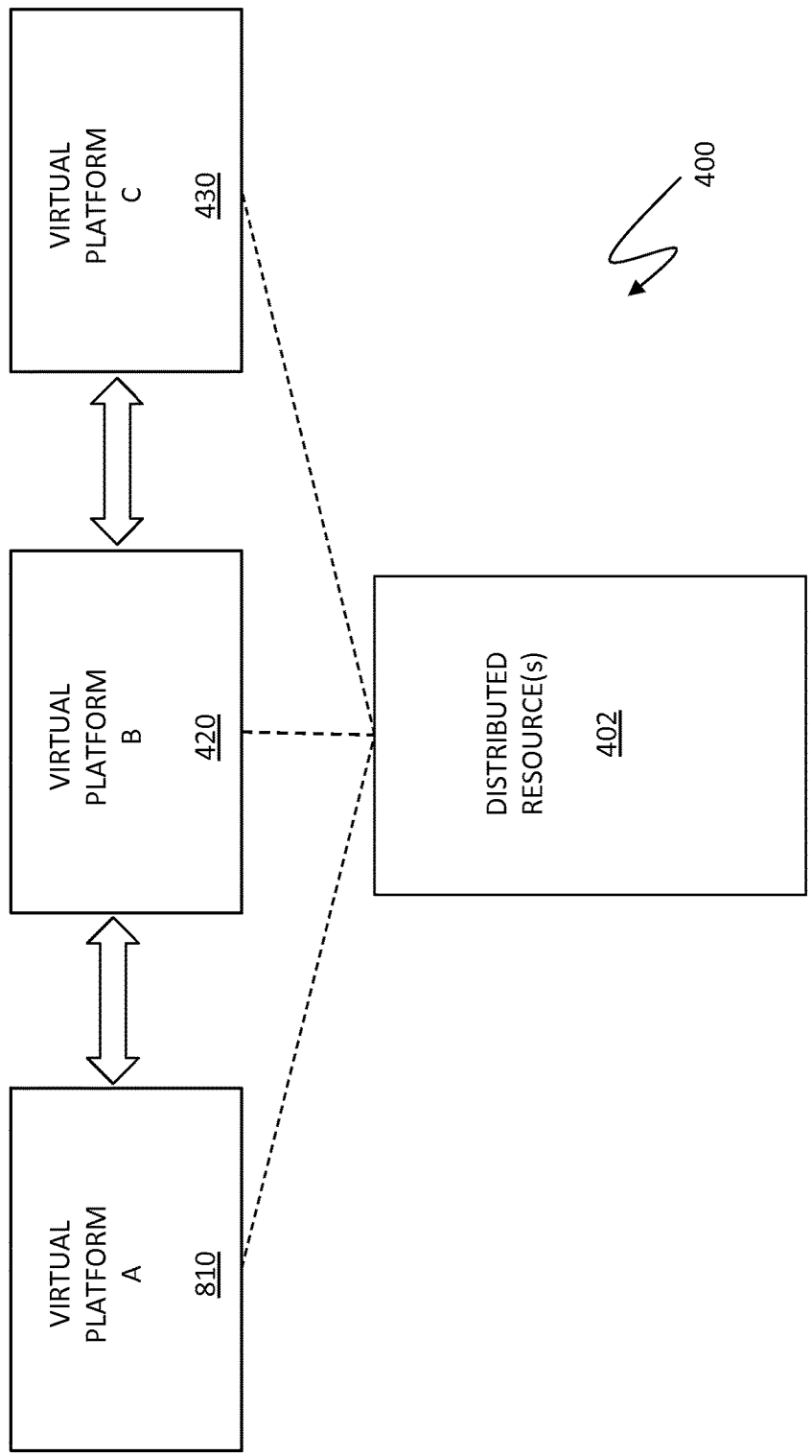
FIG. 8 is a schematic illustration showing a distributed processing system having multiple virtual platforms according to an embodiment of the system described herein.

FIG. 8 is a schematic illustration showing a distributed processing system 400 having multiple virtual platforms A, B, C 410, 420, 430 according to an embodiment of the system described herein. The virtual platforms A, B, C 410, 420, 430 may each be coupled to one or more distributed resources, like distributed resource 402 as illustrated. In an embodiment, each of the virtual platforms A, B, C 410, 420, 430 may be a VPLEX cluster. The distributed resource 402 may include a converged infrastructure, such as a Vblock, that is accessible by each of the virtual platforms 410, 420, 430, as further discussed elsewhere herein. It is further noted that the virtual platforms A, B, C 410, 420, 430 may also be communicatively coupled, as shown. Each of the virtual platforms A, B, C 410, 420, 430 may include an interface like that shown in connection with the virtual platform 310 of the distributed processing system 300.

Figure 9:
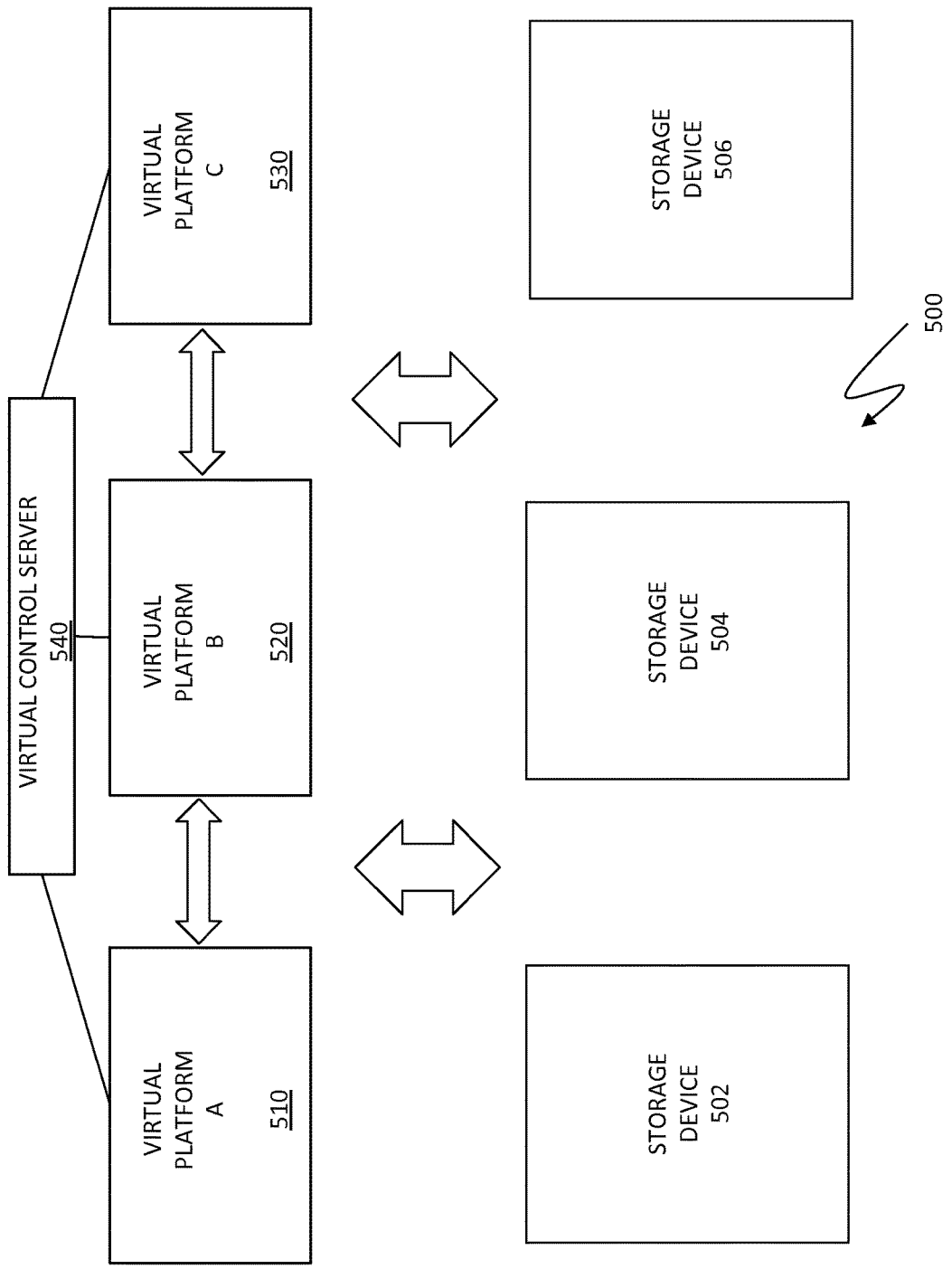
FIG. 9 is a schematic illustration showing a distributed processing system that further illustrates a virtual control server according to an embodiment of the system described herein.

FIG. 9 is a schematic illustration showing a distributed processing system 500 that further illustrates a virtual control server 540 according to an embodiment of the system described herein. In an embodiment, the virtual control server 540 may be a vCenter server product produced by VMWare, Inc. of Palo Alto, Calif. The virtual control server 540 may be coupled to one or more of the virtual platforms 510, 520, 530. In various embodiments, the virtual control server 540 may be part of a standalone server and/or may be distributed across one or more of the virtual platforms 510, 520, 530. The virtual control server 540 may control the providing of services using the multi-connected virtual platforms 510, 520, 530 and the shared resources thereof in connection with the access and use of the resources distributed across one or more of the converged infrastructures 502, 504, 506, as further discussed in detail elsewhere herein.

According to the system described herein, in a system that separates the control (management) layer from the data layer of a distributed storage system, it is advantageous to present an application programming interface (API) provider that manages storage awareness of the virtual control servers with at least one virtual array and underlying physical arrays. The system described herein further advantageously enables multi-tenant support to provide individual and/or isolated access to shared storage resources among multiple tenants and offers improved scalability and operations in a cloud deployment.

Figure 10:
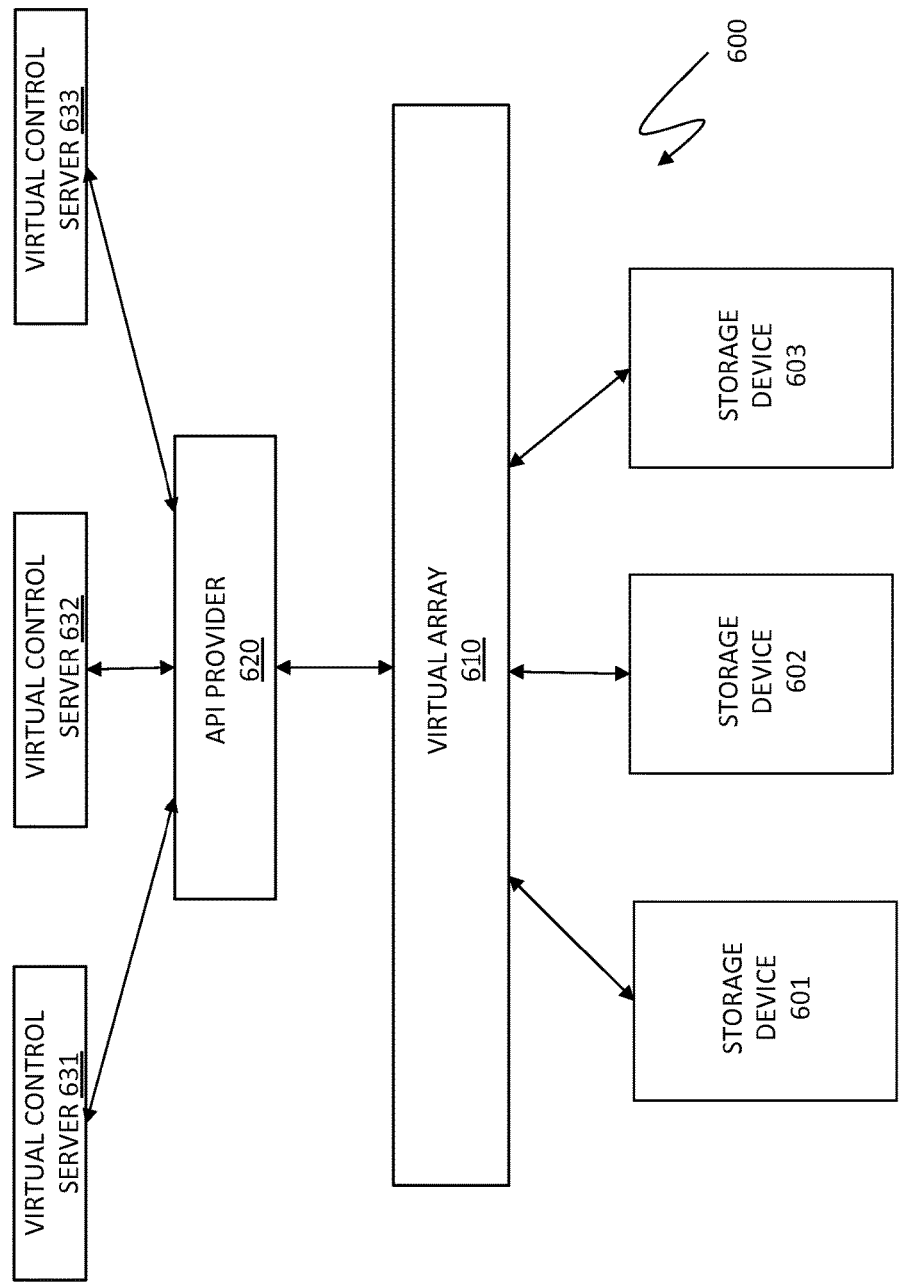
FIG. 10 is a schematic illustration showing a multi-tenant virtualized storage system according to an embodiment of the system described herein.

FIG. 10 is a schematic illustration showing a multi-tenant virtualized storage system 600 according to an embodiment of the system described herein. The system 600 may include a virtual array 610 that may be provided in connection with one or more data centers. The virtual array 610 may include one or more virtual platforms, as further discussed elsewhere herein, and may be provide the architecture for storage, networking and servers that separates the control or management layer(s) from the data layer(s) of the storage system 600. Beneath the virtual array may be one or more physical arrays of storage devices 601-603. Although three storage devices are illustrated, the system described herein may operate with any number of storage devices. In various embodiments, the storage devices may include an appropriate type of storage devices, such storage device products produced by EMC Corporation, including VMAX, VNX and/or Isilon storage device products. In various embodiments, the virtual array 610 may be implemented using a software storage control platform product, such as EMC's Virtualization Platform Re-imagined (ViPR) product, to enable management of large scale data centers.

An API provider 620 is illustrated that enables storage device management software to inform a virtual control server of how the file system (e.g., VMFS) storage is configured and protected. In an embodiment, the API provider 620 may be a vSphere Storage API for Storage Awareness (VASA) provider product from EMC Corporation. This information may be used to allow administration of server virtualization components, such as vSphere, of virtual control servers 631-633 (e.g., vCenter servers) to make informed decisions as to VM placement. Although three virtual control servers 631-633 are illustrated, the system described herein may be used in connection with any appropriate number of virtual control servers. The API provider 620 enhances the ability for the server virtualization technology (e.g., vSphere) administrators to track how storage devices 601-603 are configured to meet performance and availability needs.

The API provider 620 may be used to expose the virtual array 610 to the virtual control servers 631-633. Advantageously, as more arrays are brought under the control of virtual array 610, the virtual control servers may not be affected. Specifically, the virtual control servers do not have to rebuild their inventories of arrays and storage processors when the infrastructure changes. This is a significant advantage in a cloud deployment which is often dynamic.

Each administrator of the virtual control servers 631-633 may add and/or otherwise enable functionality of the API provider 620 to one of the virtual control servers using credentials in the virtual array 610. The API provider 610 uses the credentials to get the inventory information from the virtual array 610 for each of the virtual control servers. In a multi-tenant environment this allows each tenant to run a separate or independent virtual infrastructure which can securely share the storage from the instance of the virtual array 610. The API provider 620 may maintain independent sessions for each virtual control server connection, and maintain a separate state for each session. Advantageously, this allows multiple virtual control servers to connect to one common API provider and each can get only their own resources reported to them.

In an embodiment, the system described herein may be used to further control the events and alerts that are reported to each of the virtual control servers 631-633 in the multi-tenant environment. Specifically, all events and alerts of the virtual array 610 may be reported to the API provider 620, while the API provider may then filter the events and alerts based on the credentials of each virtual control server admin and report only the relevant alerts and events to each virtual control server. This prevents unnecessary or irrelevant alerts from being reported to the virtual control servers 631-633. For example, an alert to say that a volume is running out of space should logically be reported to only the virtual control server(s) to whom that volume is exported. The virtual array reports many alerts, and it is advantageous to avoid inundation of any of the virtual control servers 631-633 with irrelevant alerts. Security issues may also be advantageously controlled in that a virtual control server admin who does not have certain visibility into resources through the virtual array 610 should not get that visibility indirectly through the API provider 620. For more detailed discussions of correlating events and alerts in a virtualized storage system in a cloud environment reference is made to U.S. patent application Ser. No. 13/561,340 to Jain et al., filed Jul. 30, 2012, and entitled "Scalable Codebook Correlation for Cloud Scale Topology," which is incorporated herein by reference.

In another embodiment, the API provider 620 according to the system described herein may have the ability to restrict access of virtual control server admin to facilitate the controlled segregation of resources. For example, virtual control server admins may be restricted to specific projects involving particular storage and VM resources. For example, metering feeds may be project based, and thus project based isolation may help in aligning the metering feed from the virtual array 610 to the metering used by particular ones of the virtual control servers 631-633. In an embodiment, there may be ways in which the API provider 620 can perform access restriction and/or project isolation. First, by providing a project name while connecting to the API provider 620 (in the URL), a virtual control server admin can be restricted to a particular project. Second, by allowing the virtual control server admin a designated role (PROJECT_ADMIN) for one project, the virtual control server admin may see only the resources which belong to one project.

Figure 11:
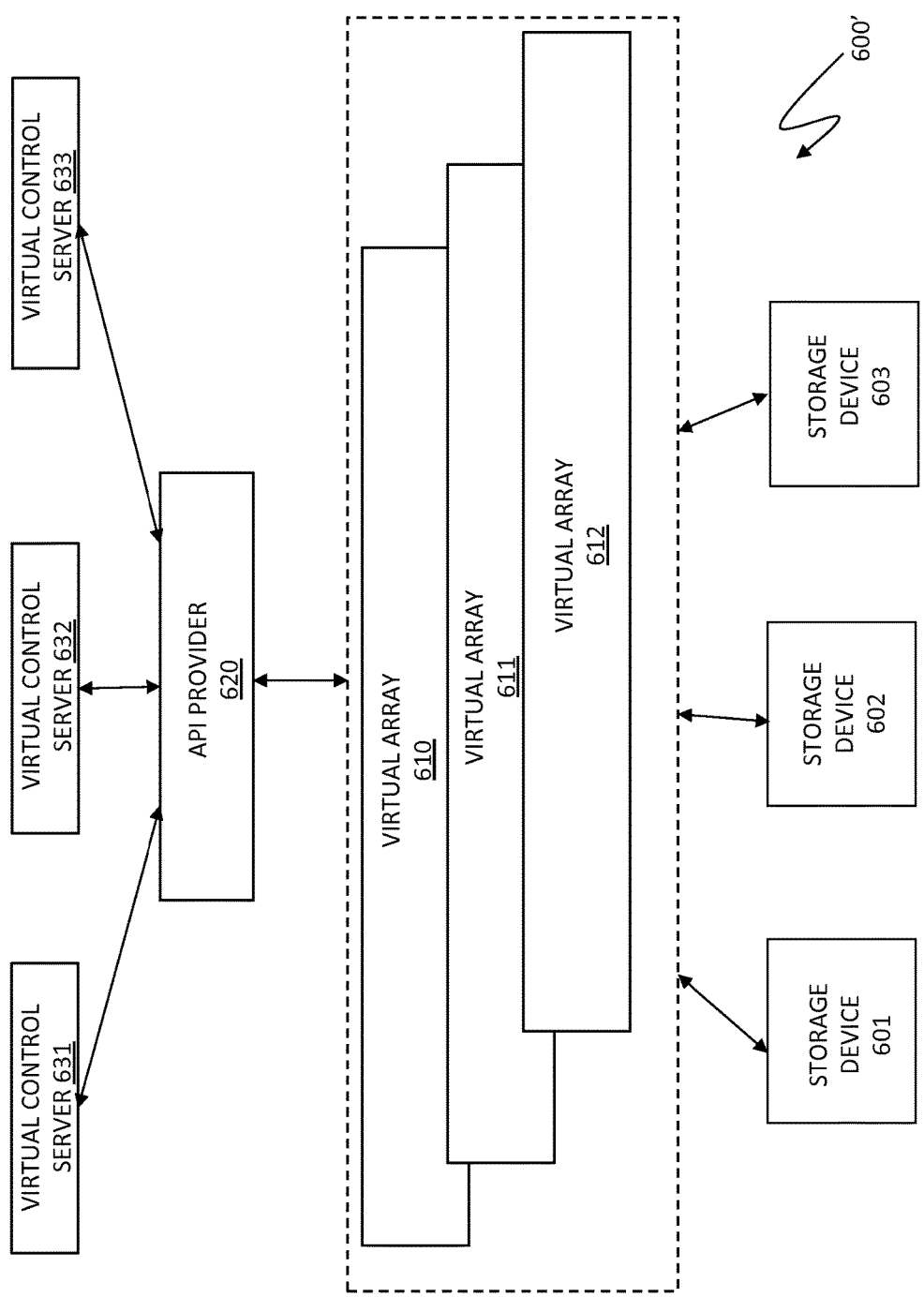
FIG. 11 is a schematic illustration showing a multi-tenant virtualized storage system according to another embodiment of the system described herein.

FIG. 11 is a schematic illustration showing a multi-tenant virtualized storage system 600' according to another embodiment of the system described herein. The system 600' may have similar components as the system 600 and further illustrates multiple virtual arrays 610, 611, 612. The system described herein may enable designation of a virtual array with a class of service. A class of service may be identified as a uniform entity with specific performance, reliability and cost characteristics. The API provider 620 may interface with the multiple virtual arrays 610, 611, 612 and may report a class of service of each of the virtual arrays 610, 611, 612. In a cloud environment, there may be multiple well-defined classes of service, and each class of service may then be reported by the API provider 620 as a distinct virtual array and used in connection with the provided multi-tenancy support for the virtual control servers 631-633.

Figure 12:
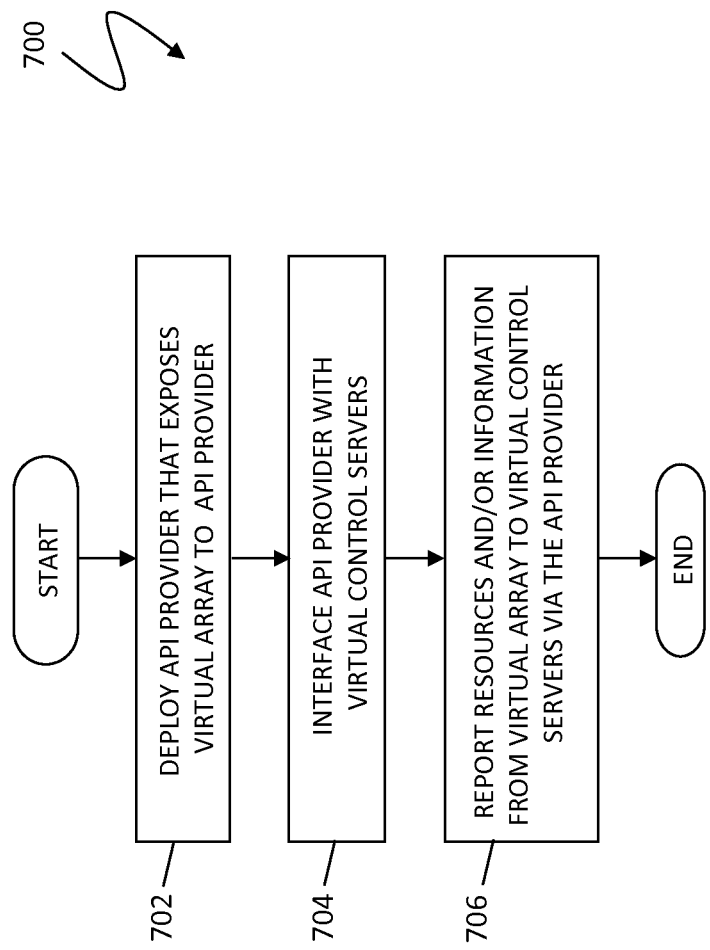
FIG. 12 is a flow diagram showing processing for multi-tenant virtual control server operation in a cloud environment according to an embodiment of the system described herein.

FIG. 12 is a flow diagram 700 showing processing for multi-tenant virtual control server operation in a cloud environment according to an embodiment of the system described herein. At a step 702, an API provider is deployed in which a virtual array, managing underlying physical storage arrays, is exposed to the API provider. After the step 702, processing proceeds to a step 704 where the API provider interfaces with a plurality of virtual control servers in connection with providing and managing requested resources, specifically storage resources, by one or more hosts. It is noted that the interfacing of the API with the virtual control servers may include a virtual control server admin of each virtual control server accessing the virtual array using separate and independent credentials. After the step 704, processing proceeds to a step 706 where requested resources or information of the virtual array, to fulfill host requests and/or in connection with events or alerts, are separately and independently reported via the respective relevant virtual control servers to provide isolated multi-tenant support by the multiple virtual control servers to the virtual array and underlying physical storage resources. It is noted that the step 706 may continue for an indefinite amount of time, noting that, in some embodiments, this step may provide for a continuous loop processing requests. After the step 706, processing is complete for the described processing iteration.

Figure 13:
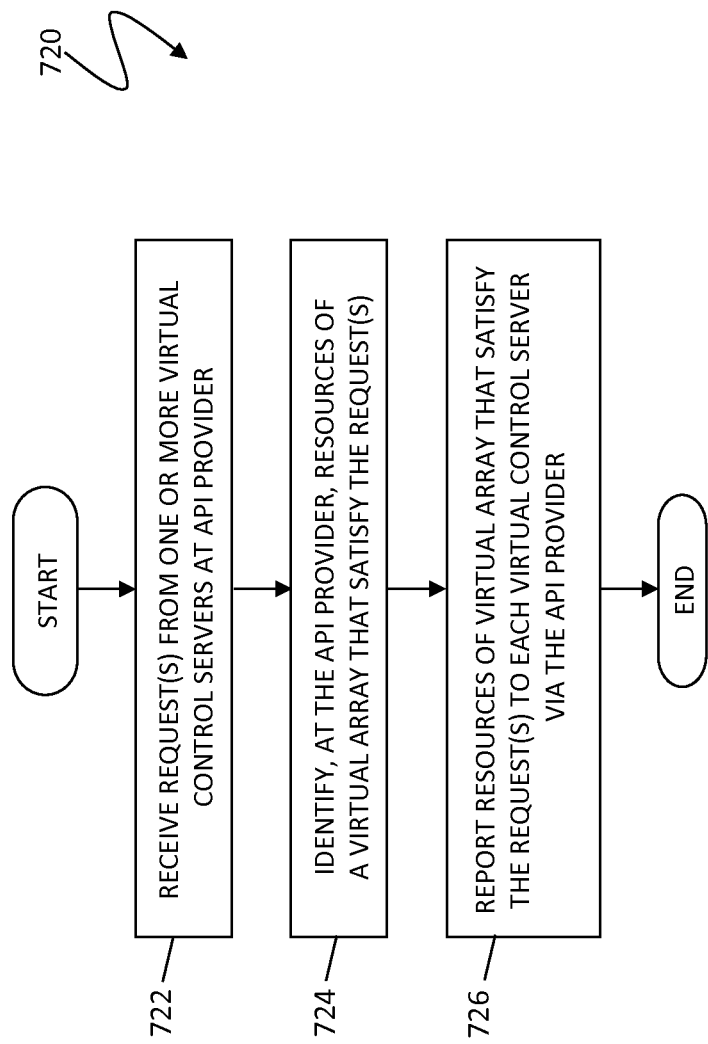
FIG. 13 is a flow diagram showing processing for multi-tenant virtual control server operation for processing host storage or processing requests in a cloud environment according to an embodiment of the system described herein.

FIG. 13 is a flow diagram 720 showing processing for multi-tenant virtual control server operation for processing host storage or processing requests in a cloud environment according to an embodiment of the system described herein. At a step 722, the API provider receives request(s) from one or more virtual control servers concerning host storage or processing requests. After the step 722, processing proceeds to a step 724 where the API provider identifies resources of a virtual array that satisfy the request(s). After the step 724, processing proceeds to a step 726 where the API provider reports the resources of the virtual array that satisfy the request(s) to each virtual control server. After the step 726, processing is complete for the described processing iteration.

FIG. 14 is a flow diagram 740 showing processing for multi-tenant virtual control server operation for processing received events or alerts of a virtual array in a cloud environment according to an embodiment of the system described herein. At a step 742, the API provider receives event or alert information concerning storage or processing resources or paths from a virtual array. After the step 742, processing proceeds to a step 744 where the API provider filters the event or alert information for affected virtual control servers. After the step 744, processing proceeds to a step 746 where the API provider reports relevant event or alert information to identified virtual control server(s). After the step 746, processing is complete for the described processing iteration.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of sharing resources in a virtualized environment, comprising:
   managing distributed resources of the virtualized environment using at least one virtual array;
   providing an application programming interface (API) provider that manages interfacing between a plurality of virtual control servers and the at least one virtual array, wherein each of the virtual control servers manages one or more virtual machines and wherein at least one of the virtual control servers manages a set of the virtual machines different from a set of the virtual machines managed by an other one of the virtual control servers;
   receiving, at the API provider, requests from the plurality of virtual control servers;
   identifying, at the API provider, resources of the at least one virtual array that are responsive to the requests; and
   reporting relevant resources and event or alert information concerning the distributed resources of the virtual array individually to each of the plurality of virtual control servers from the API provider, the relevant resources being separately responsive to each of the requests from the plurality of virtual control servers, wherein different ones of the virtual control servers receive different relevant resources of the at least one virtual array and receive different event or alert information.

2. The method according to claim 1, wherein the distributed resources are provided using a plurality of storage devices that are remotely located from each other.

3. The method according to claim 1, wherein an administrator of each of the plurality of virtual control servers uses corresponding credentials to access the at least one virtual array via the API provider.

4. The method according to claim 1, wherein the at least one virtual array includes a plurality of virtual arrays, each of the virtual arrays having distinct characteristics.

5. The method according to claim 1, further comprising:
   using the API provider to maintain isolation between the plurality of virtual control servers while enabling shared access of the resources of the at least one virtual array.

6. A non-transitory computer-readable medium storing software for sharing resources in a virtualized environment, the software comprising:
   executable code that manages distributed resources of the virtualized environment using at least one virtual array;
   executable code that provides an application programming interface (API) provider that manages interfacing between a plurality of virtual control servers and the at least one virtual array, wherein each of the virtual control servers manages one or more virtual machines and wherein at least one of the virtual control servers manages a set of the virtual machines different from a set of the virtual machines managed by an other one of the virtual control servers;

executable code that receives, at the API provider, requests from the plurality of virtual control servers;

executable code that identifies, at the API provider, resources of the at least one virtual array that are responsive to the requests; and executable code that reports relevant resources and event or alert information concerning the distributed resources of the virtual array individually to each of the plurality of virtual control servers from the API provider, the relevant resources being separately responsive to each of the requests from the plurality of virtual control servers, wherein different ones of the virtual control servers receive different relevant resources of the at least one virtual array and receive different event or alert information.

7. The non-transitory computer-readable medium according to claim 6, wherein the distributed resources are provided using a plurality of storage devices that are remotely located from each other.

8. The non-transitory computer-readable medium according to claim 6, further comprising:

executable code that receives credentials of an administrator of each of the plurality of virtual control servers that are used to access the at least one virtual array via the API provider.

9. The non-transitory computer-readable medium according to claim 6, wherein the at least one virtual array includes a plurality of virtual arrays, each of the virtual arrays having distinct characteristics.

10. The non-transitory computer-readable medium according to claim 6, further comprising:

executable code that uses the API provider to maintain isolation between the plurality of virtual control servers while enabling shared access of the resources of the at least one virtual array.

11. A method of filtering information in a virtualized environment, comprising:

managing distributed resources of the virtualized environment using at least one virtual array;

providing an application programming interface (API) provider that manages interfacing between a plurality of virtual control servers and the at least one virtual array, wherein each of the virtual control servers manages one or more virtual machines and wherein at least one of the virtual control servers manages a set of the virtual machines different from a set of the virtual machines managed by an other one of the virtual control servers;

receiving, at the API provider, event or alert information concerning the distributed resources of the virtual array;

filtering, at the API provider, the event or alert information to identify individual ones of the plurality of virtual control servers affected by the event or alert information; and reporting relevant event or alert information individually to each of the plurality of virtual control servers from the API provider, the relevant event or alert information corresponding to affected ones of the virtual control servers separately affected by the relevant event or alert information, wherein different ones of the virtual control servers receive different event or alert information.

12. The method according to claim 11, wherein the distributed resources are provided using a plurality of storage devices that are remotely located from each other.

13. The method according to claim 11, wherein an administrator of each of the plurality of virtual control servers uses corresponding credentials to access the at least one virtual array via the API provider.

14. The method according to claim 11, wherein the at least one virtual array includes a plurality of virtual arrays, each of the virtual arrays having distinct characteristics.

15. The method according to claim 11, further comprising:

using the API provider to maintain isolation between the plurality of virtual control servers while enabling shared access of the resources of the at least one virtual array.

16. A non-transitory computer-readable medium storing software for filtering information in a virtualized environment, comprising:

executable code that manages distributed resources of the virtualized environment using at least one virtual array;

executable code that provides an application programming interface (API) provider that manages interfacing between a plurality of virtual control servers and the at least one virtual array, wherein each of the virtual control servers manages one or more virtual machines and wherein at least one of the virtual control servers manages a set of the virtual machines different from a set of the virtual machines managed by an other one of the virtual control servers;

executable code that receives, at the API provider, event or alert information concerning the distributed resources of the virtual array;

executable code that filters, at the API provider, the event or alert information to identify individual ones of the plurality of virtual control servers affected by the event or alert information; and executable code that reports relevant event or alert information individually to each of the plurality of virtual control servers from the API provider, the relevant event or alert information corresponding to affected ones of the virtual control servers separately affected by the relevant event or alert information, wherein different ones of the virtual control servers receive different event or alert information.

17. The non-transitory computer-readable medium according to claim 16, wherein the distributed resources are provided using a plurality of storage devices that are remotely located from each other.

18. The non-transitory computer-readable medium according to claim 16, wherein the software further comprises:

executable code that receives credentials of an administrator of each of the plurality of virtual control servers that are used to access the at least one virtual array via the API provider.

19. The non-transitory computer-readable medium according to claim 16, wherein the at least one virtual array includes a plurality of virtual arrays, each of the virtual arrays having distinct characteristics.

20. The non-transitory computer-readable medium according to claim 16, further comprising:

executable code that uses the API provider to maintain isolation between the plurality of virtual control servers while enabling shared access of the resources of the at least one virtual array.

* * * * *